US012778120B2

(12) United States Patent
Johnson

(10) Patent No.: US 12,778,120 B2
(45) Date of Patent: Nov. 3, 2026

(54) ANTIMICROBIAL COMPOSITIONS AND METHODS FOR THEIR PREPARATION AND USE IN TREATING PLANT DISEASES

(71) Applicant: Thomas D. Johnson, Buffalo, SD (US)

(72) Inventor: Thomas D. Johnson, Buffalo, SD (US)

( * ) Notice: Subject to any disclaimer, the term of this patent is extended or adjusted under 35 U.S.C. 154(b) by 0 days.

(21) Appl. No.: 18/533,651

(22) Filed: Dec. 8, 2023

(65) Prior Publication Data

US 2024/0099299 A1 Mar. 28, 2024

Related U.S. Application Data

(63) Continuation-in-part of application No. 17/516,229, filed on Nov. 1, 2021, now Pat. No. 12,382,956.

(51) Int. Cl.
*A01N 37/18* (2006.01)
*A01N 25/04* (2006.01)
*A01P 1/00* (2006.01)

(52) U.S. Cl.
CPC ............. *A01N 37/18* (2013.01); *A01N 25/04* (2013.01); *A01P 1/00* (2021.08)

(58) Field of Classification Search
CPC .......... A01G 7/06; A01N 25/02; A01N 59/00; A01N 43/16; A01P 1/00
USPC .................... 47/1.01 R; 523/122; 504/116.1; 424/405
See application file for complete search history.

(56) References Cited

U.S. PATENT DOCUMENTS 2,801,950 A * 8/1957 Tate ....................... A01N 63/28 424/114
2,909,466 A * 10/1959 Neumann ............. A61K 31/65 514/153
4,112,617 A * 9/1978 Purviance ................ A01G 7/06 401/190
4,173,702 A * 11/1979 Gorman .................. C12P 35/08 540/215
9,497,964 B2 * 11/2016 Dagher .................. A01N 59/00
9,894,899 B1 * 2/2018 Schweighofer ........ A01N 37/46
10,349,645 B2 7/2019 Kitajima
10,349,654 B1 * 7/2019 Schweighofer ........ A01N 59/16
(Continued)

FOREIGN PATENT DOCUMENTS

CN 105801246 3/2016
CN 105668684 A * 6/2016 .............. C02F 1/286
(Continued)

OTHER PUBLICATIONS

The Determination of Optimal Concentration and PH of Tetracycline Hydrochloride for Trunk Injection of Greening Citrus Trees. Author: VanBurren Published Mar. 17, 1976.
(Continued)

*Primary Examiner* — Kimberly S Berona
*Assistant Examiner* — Kevin M Dennis

(57) ABSTRACT

An antimicrobial composition for treating plant diseases includes oxytetracycline (OTC) and an acid substantially dissolved in water to generate an OTC solution having a pH in a range of 1.8 to 2.5 and a concentration of the oxytetracycline sufficient to treat a bacterial infection in a plant. The OTC or the salt thereof has a purity sufficient to generate an OTC solution that is substantially stable for a time period required for its delivery to a plant. The OTC solution can be delivered systemically to a plant to treat a bacterial disease inflicting the plant.

9 Claims, 9 Drawing Sheets

(56) References Cited

U.S. PATENT DOCUMENTS

| | | | | |
|---|---|---|---|---|
| 2013/0089593 | A1* | 4/2013 | Myntti | A01N 41/04 514/642 |
| 2013/0259957 | A1* | 10/2013 | Dagher | A01N 37/16 424/722 |
| 2017/0112131 | A1* | 4/2017 | Meadows | A01N 37/10 |
| 2020/0255851 | A1* | 8/2020 | Thompson | C12N 9/2405 |
| 2020/0329710 | A1* | 10/2020 | Farmer | A01N 43/22 |

FOREIGN PATENT DOCUMENTS

| | | | | | |
|---|---|---|---|---|---|
| CN | 105801246 | A | * | 7/2016 | A01N 59/14 |
| CN | 108294049 | B | | 1/2018 | |
| JP | 2005232050 | A | * | 9/2005 | |
| WO | WO-2005104843 | A2 | * | 11/2005 | A01N 37/06 |
| WO | WP2019173810 | | | 3/2018 | |
| WO | WO-2019064219 | A1 | * | 4/2019 | A01N 59/08 |

OTHER PUBLICATIONS

Effect of Growing Media PH on Peformance of Haunglongbing-Affected Young Citrus Trees Author: Shazad; Published 0-13-2021.

B. Aubert and J.M. Bove, Effect of Penicillin or Tetracycline Injections of Citrus Trees Affected by Greening Disease Under Field Conditions in Reunion Island, p. 103-108, In: Proceedings of the Eighth Conference of the International Organization of Citrus Virologists, 1980. See at: https://escholarship.org/uc/item/9w33200r.

Oxytetracycline hydrochloride https://www.chemicalbook.com/ChemicalProductProperty_EN_CB9311671.htm.

P. Punamiya, D. Sakar, S. Rakshit and R. Datta. Effectiveness of Aluminum-based Drinking Water Treatment Residuals as a Novel Sorbent to Remove Tetracyclines from Aqueous Medium, J. Environ. Qual. Sep. 2013; 42 (5):1449-1459. See at: https://pubmed.ncbi.nlm.nih.gov/24216422/.

C.H. Buitendag and G.J. Bronkhorst, Micro Injection of Citrus Trees with N-Pyrrolidinomethyl Tetracycline (PMT) for the Control of Greening Disease, In: The Citrus and Subtropical Fruit Journal, Apr. 1983. See at: https://swfrec.ifas.ufl.edu/hlb/database/pdf/00001572.pdf.

Tetracycline Hydrochloride https://www.sigmaaldrich.com/deepweb/assets/sigmaaldrich/product/documents/348/160/t3383pis.pdf.

Control of Citrus Greening and its Psylla Vector by Trunk Injections of Tetracyclines and Insecticides, R.E. Schwarz, J. N. Moll, and S. P. van Vuuren. http://dx.doi.org/10.5070/C56189m3pk Retrieved from https://escholarship.org/uc/item/6189m3pk.

Control of Citrus Huanglongbing via Trunk Injection of Plant Defense Activators and Antibiotics, J. Hu, J. Jiang, and N. Wang (Dec. 14, 2017). Phytopathology® 2018 108:2, 186-195. https://apsjournals.apsnet.org/doi/epdf/10.1094/PHYTO-05-17-0175-R.

* cited by examiner

ANTIMICROBIAL COMPOSITIONS AND METHODS FOR THEIR PREPARATION AND USE IN TREATING PLANT DISEASES

CROSS-REFERENCE TO RELATED APPLICATIONS

I hereby claim the benefit under 35 U.S.C., Section 120 of U.S. application Ser. No. 17/516,229 filed Nov. 1, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

Bacterial diseases of perennial plants have been a source of concern for agriculture for many years. Bacterial diseases spread rapidly, often by wind, rain, or vectoring by an insect. When conditions are favorable, these bacterial pathogens can grow quickly and cause irreversible damage to a crop. Of particular note are vascular tissue colonizing bacterial species. Due to a relatively slow growth rate, these pathogens may not be detected for several growing seasons and already will have begun to negatively impact tree and vine health. Because perennial plants require a number of years to achieve productivity, any colonization by a bacterial pathogen will have long-term implications on the economic viability of the crop. Though not exhaustive, *Erwinia* spp., *Psuedomonas* spp., *Xanthamonas* spp., *Xylophilus* spp., *Xylella* spp., *Candidatus liberibacter* spp., and *Rickettsia* spp. are representative difficult to control pathogens which require extensive use of foliar antibiotics and insecticides to improve plant productivity and to limit their spread.

Among the most difficult to mitigate and control pathogens are vascular-colonizing bacterial species: *Candidatus liberibacter* spp., a phloem-colonizing bacterial pathogen which is the causal agent of Citrus Greening Disease/HLB, and *Xylella* fastidiosa, a xylem-colonizing bacteria that is the causal agent of Pierce's Disease in grapes, Coffee Leaf Scorch Disease in coffee plants, Citrus Variegated Chlorosis in Citrus, and Olive Quick Decline Syndrome in Olives. Because these organisms reside in the vascular tissue of these perennial species, their control is difficult due to a lack of effective antimicrobials or delivery mechanisms. Common control practices include foliar applications of antimicrobials, which suffer from poor penetration into the foliage and poor mobilization through the vascular tissue, control of insect vectors, using limited resistant rootstocks or varieties, increased fertilizer applications as an attempt to grow through the diseases, or, in dramatic and costly cases, removal of infected plants and replanting. For insect vectored plants, initial bacterial titers upon infection are low, but can reach as high as $10^7$ Colony Forming Units (CFUs) per gram fresh tissue. When multiplied out to account for the size of the roots, vines or tree limbs, and corresponding foliage, the number of bacterial colonies within the tree can seem overwhelming.

The disclosure relates to antimicrobial compositions and more particularly pertains to a new antimicrobial compositions and methods for treating plant diseases. The present invention discloses novel antimicrobial compositions and methods for their use in treating *liberibacter* infections in plants, and in particular infections of *Candidatus liberibacter africanus, Candidatus liberibacter americanus*, and *Candidatus liberibacter asiaticus*, or mutants thereof in citrus trees, where they cause what is commonly known as citrus greening disease. This invention also may be used to control other perennial vascular or tissue inhabiting bacterial pathogens including *Xyllela* spp. *Erwinia* spp., *Psuedomonas* spp., *Xanthamonas* spp., *Xylophilus* spp., and *Rickettsia* spp.

(2) Description of Related Art Including Information Disclosed Under 37 CFR 1.97 and 1.98

The prior art relates to antimicrobial compositions. Prior art antimicrobial compositions for treating citrus greening disease may comprise solutions of tetracycline antibiotics and bark penetrants at a pH of 5.5-6.5 and solutions of auxins and cytokinins at a pH of 5-7 applied by spraying on plants and soil, ampicillin formulated at a pH of 6.5 or liquids obtained from *Paenibacillus polymyxa* cultures at a pH of 6.0 applied by injection, and beneficial microorganisms and their fermentation products applied to leaves, fruit, seeds, and soil. The prior art also discloses methods for forming protective layers on plants, wherein the protective layers comprise antibiotics that may prevent infections. What is lacking in the prior art is an oxytetracycline (OTC) solution having a pH of 1.8 to 2.5, which is substantially stable for at least two hours at 100° F. and for at least 24 hours at °75 F, and which can be delivered to the vascular network of a citrus tree to treat citrus greening disease.

BRIEF SUMMARY OF THE INVENTION

An embodiment of the disclosure meets the needs presented above by generally comprising oxytetracycline (OTC) and an acid substantially dissolved in water to generate an antimicrobial composition having a pH in a range of 1.8 to 2.5 and a concentration of the oxytetracycline sufficient to treat a bacterial infection in a plant. The OTC or the salt thereof has a purity sufficient to generate an OTC solution that is substantially stable for a time period required for its delivery to a plant. The OTC solution thus is configured for systemic delivery to a plant to treat a bacterial disease inflicting the plant.

Another embodiment of the disclosure includes a method for preparing an acidified OTC solution and its use in treating a bacterial infection in a plant. Yet embodiment of the disclosure includes a citrus tree treated according to the method.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWING

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
FIG. 1 is a representative picture of a Valencia orange tree treated by injection with a solution of oxytetracycline acidified to pH 2.
Figure 2:
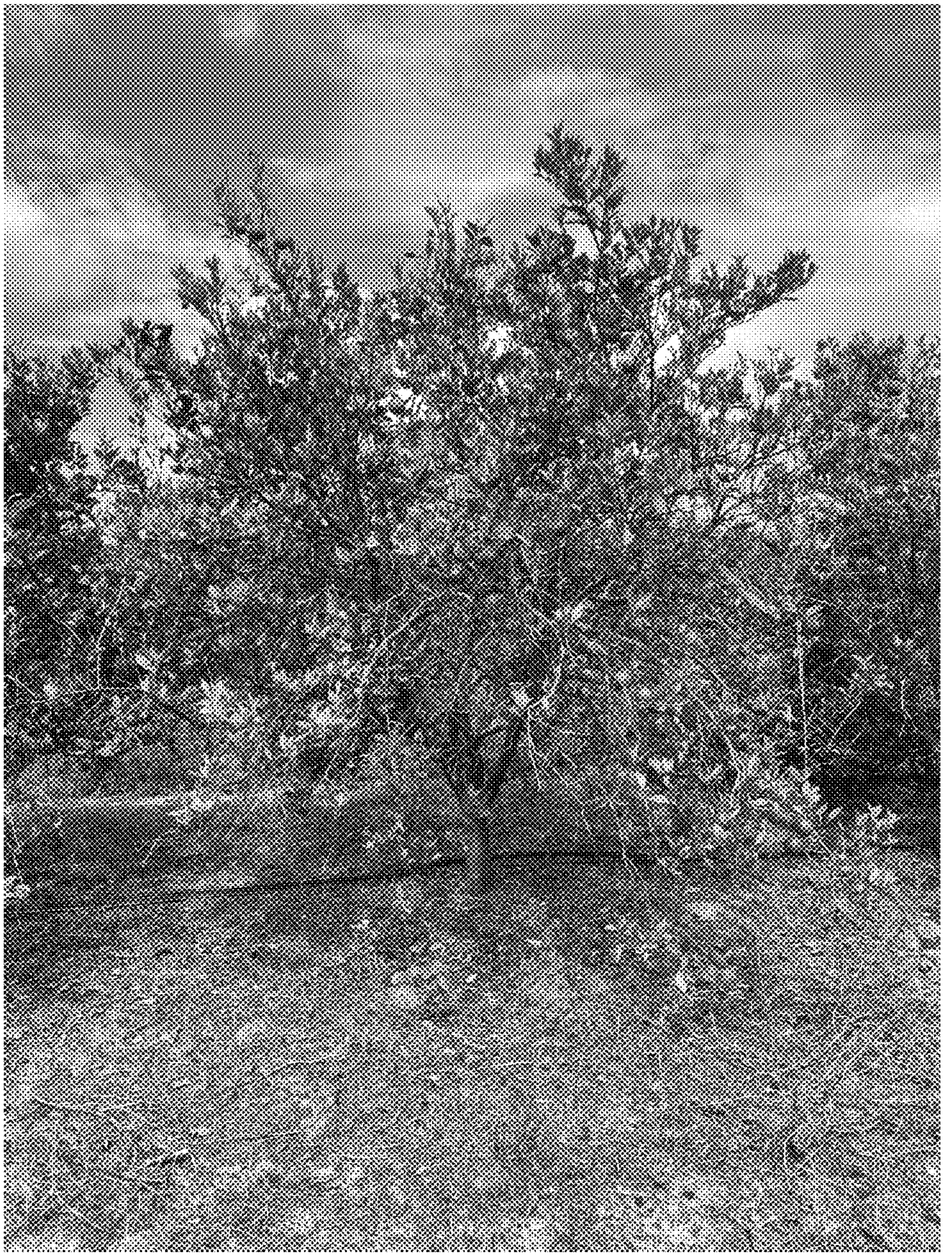
FIG. 2 is a representative picture of a Valencia orange tree treated by foliar spraying with an unacidified oxytetracycline solution.
Figure 3:
FIG. 3 is a representative picture of an untreated Valencia orange tree.

With reference now to FIGS. 1-9, a new antimicrobial composition embodying the principles and concepts of an embodiment of the disclosure and a method will be described.

The antimicrobial composition generally comprises oxytetracycline (OTC) and an acid substantially dissolved in water to generate an OTC solution having a pH in a range of 1.8 to 2.5 and a concentration of the oxytetracycline sufficient to treat a bacterial infection in a plant. The OTC or the salt thereof has a purity sufficient to generate an OTC solution that is substantially stable for a time period required for its delivery to a plant. For example, OTC having a purity greater than 95% can be used to prepare an OTC solution that is substantially stable for at least 2 hours at 100° F. and for at least 24 hours at °75 F. The present invention anticipates OTC having a purity of 92% being used to generate OTC solutions that are substantially stable. The present invention anticipates use of cosolvents, such as, but not limited to, alcohols, dimethyl sulfoxide, and the like. The OTC solution enables treatment of a citrus tree that has been infected by *Candidatus liberibacter africanus, Candidatus liberibacter americanus, Candidatus liberibacter asiaticus*, or the like. The OTC solution may have an OTC concentration of 500 to 25,000 parts per million. The OTC solution may have an OTC concentration of 500-12,000 parts per million.

The acid may comprise an inorganic acid, although the present invention also anticipates the acid comprising an organic acid, or a combination of an inorganic acid and an organic acid. The acid may comprise hydrochloric acid, phosphoric acid, nitric acid, acetic acid, citric acid, or the like.

The OTC solution is configured for systemic delivery to a plant to treat a bacterial disease inflicting the plant. The OTC solution may be configured for injection into the vascular network of a tree or vine.

The present invention anticipates a method (FIG. 9) of generating an acidified OTC solution and its use in treating a bacterial infection in a plant. The method comprises a first step of adding OTC or a salt thereof to water in an amount sufficient to generate a first solution having an OTC concentration sufficient to treat a bacterial infection in a plant. A second step of the method is titrating the first solution using an acid to generate an OTC solution having a pH of from 1.8 to 2.5. The OTC or the salt thereof has a purity sufficient to generate an OTC solution that is substantially stable for a time period required for its delivery to a plant. A third step of the method is drilling a hole into a trunk of a tree or vine. A fourth step of the method is injecting the second solution into a vascular network of the tree or vine. As will be apparent to those of ordinary skill in the art, the order of addition of the OTC and the acid to the water can be reversed upon determination of the quantities of each required to achieve a desired pH of the OTC solution.

Provided below are detailed examples of the antimicrobial compositions for treating plant diseases and methods for their use in treating bacterial infections in plants. These examples should not be viewed as limiting regarding compositions, methods of preparation and use, or plant species.

I. Definitions

Tree Vigor Ratings: 1=Lowest Vigor; 5=Highest Vigor. LSD stands for least significant difference and C.V. stands for Coefficient of Variance. "a" denotes the corresponding value is significantly different from any other value that does not contain the letter "a". Similarly, "b" denotes the corresponding value is significantly different from any other value that does not contain the letter "b".

II. Analytical Testing of OTC Solutions Prepared Using OTC of Different Qualities In seeking to assess the importance of manufacturing quality of OTC for stability and function of OTC solutions for use according to this disclosure, analytical testing first was performed on three lots each Pharmaceutical Grade OTC HCl (>95%, PG-OTC, Century Pharmaceuticals LTD, Gujarat, India, supplied TJ BioTech LLC) and non-sterile, non-Pharmaceutical Grade OTC HCl (putatively 95%, nS-nPG-OTC, undetermined manufacturer, supplied by AgroSource Inc). The results of these analytical tests are shown in Table 1. Values in bold are below those for the specification of PG-OTC, which is shown in column 2 of Table 1.

TABLE 1

| Test | Spec | PG-OTC 1 | PG-OTC 2 | PG-OTC 3 | PG-OTC Average | nS-nPG-OTC 1 | nS-nPG-OTC 2 | nS-nPG-OTC 3 | nS-nPG-OTC Average |
|---|---|---|---|---|---|---|---|---|---|
| Assay | as is | 96.17 | 96.45 | 97.12 | 96.58 | **89.22** | **90.23** | **88.01** | **89.15** |
| Water | NMT 2% | 1.23 | 1.57 | 1.38 | 1.39 | **3.52** | **3.29** | **3.75** | **3.52** |
| ABS 430 nm | NMT 0.50 | 0.1345 | 0.1329 | 0.1373 | 0.1349 | 0.2455 | 0.3290 | 0.3879 | 0.3208 |
| ABS 490 nm | NMT 0.20 | 0.0111 | 0.0130 | 0.0127 | 0.0123 | 0.1115 | 0.1510 | 0.1290 | 0.1305 |
| Impurity E | NMT 0.20 | 0.120 | 0.117 | 0.102 | 0.113 | **0.270** | **0.287** | **0.332** | **0.296** |
| Total Impurities | NMT 3.5 | 2.013 | 1.934 | 1.876 | 1.941 | 2.359 | 2.250 | **3.522** | 2.710 |

Figure 4:
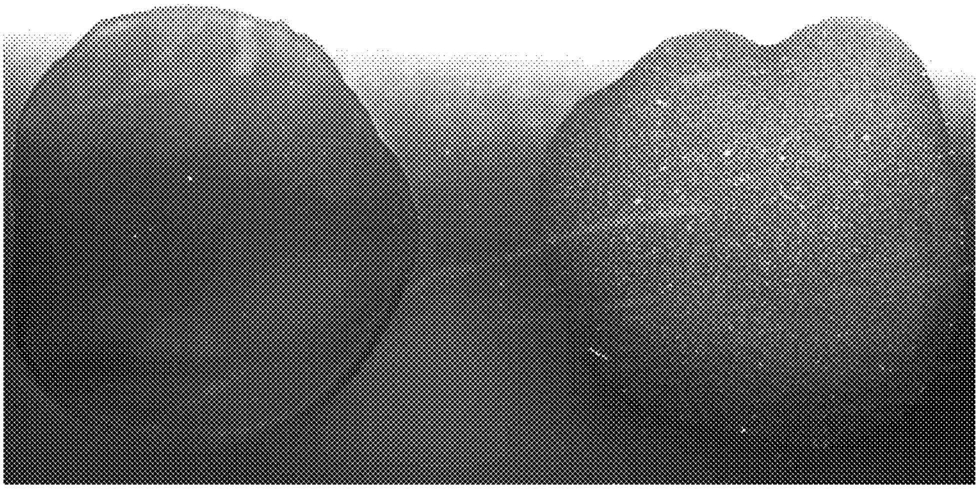
FIG. 4 is a 10× magnification comparison of solutions of Pharmaceutical Grade Oxytetracycline HCl (PG-OTC) and non-Sterile non-Pharmaceutical Grade Oxytetracycline (nS-nPG-OTC) immediately after preparation at 75° F.
Figure 5:
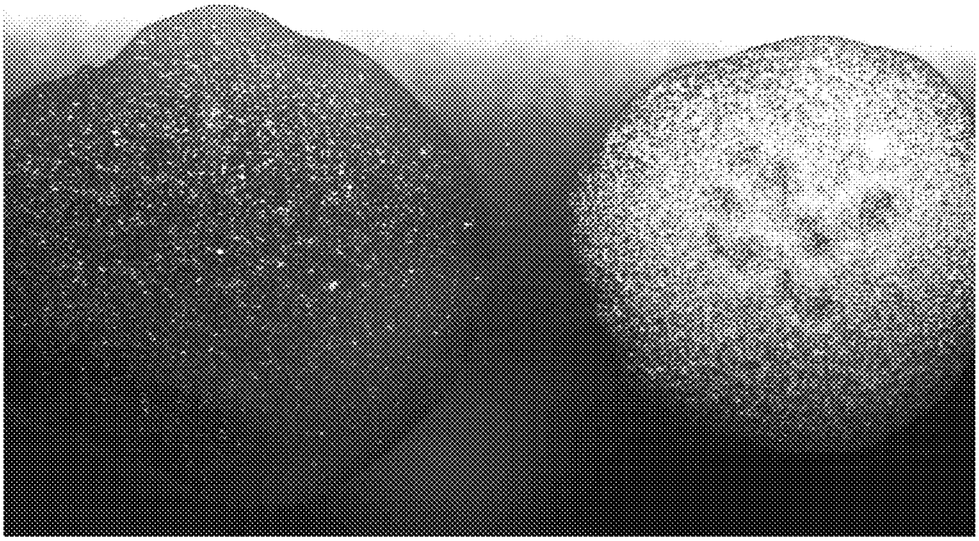
FIG. 5 is a 10× magnification comparison of solutions of PG-OTC and nS-nPG-OTC after 24 hours at 75° F.
Figure 6:
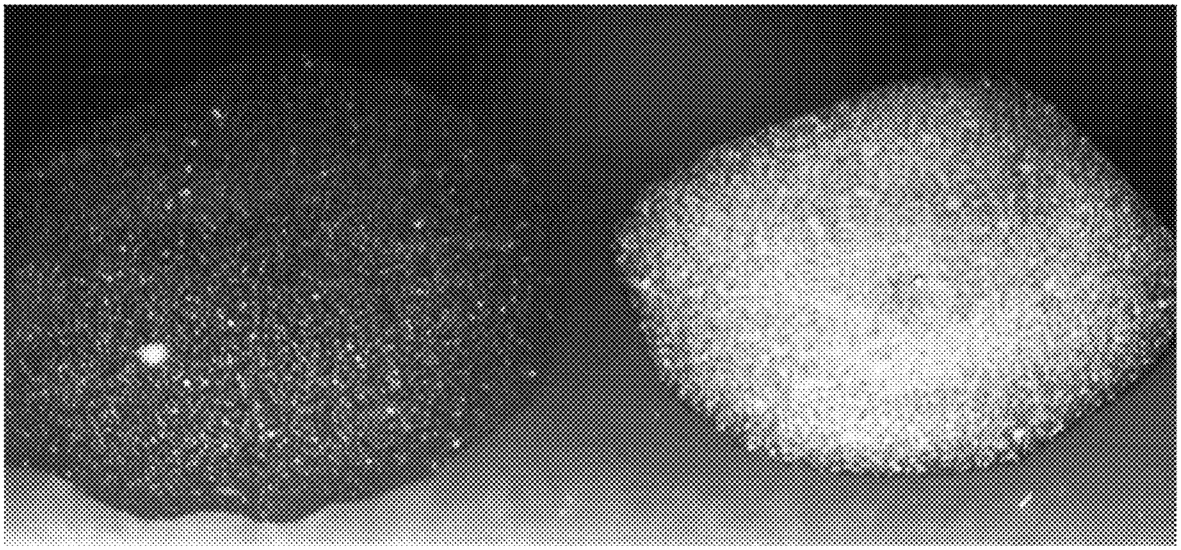
FIG. 6 is a 10× magnification comparison of solutions of PG-OTC and nS-nPG-OTC after 48 hours at 75° F.
Figure 7:
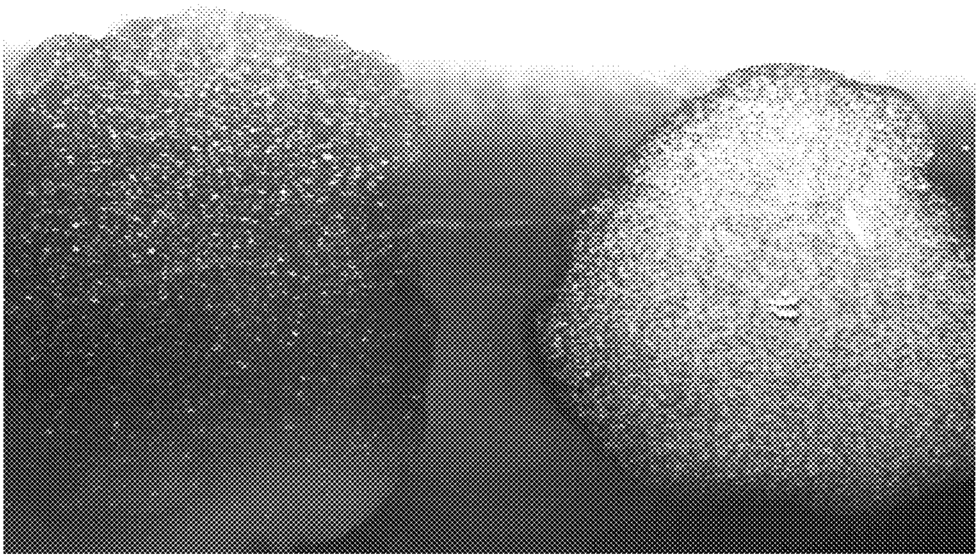
FIG. 7 is a 10× magnification comparison of solutions of PG-OTC and nS-nPG-OTC after two hours at 100° F.
Figure 8:
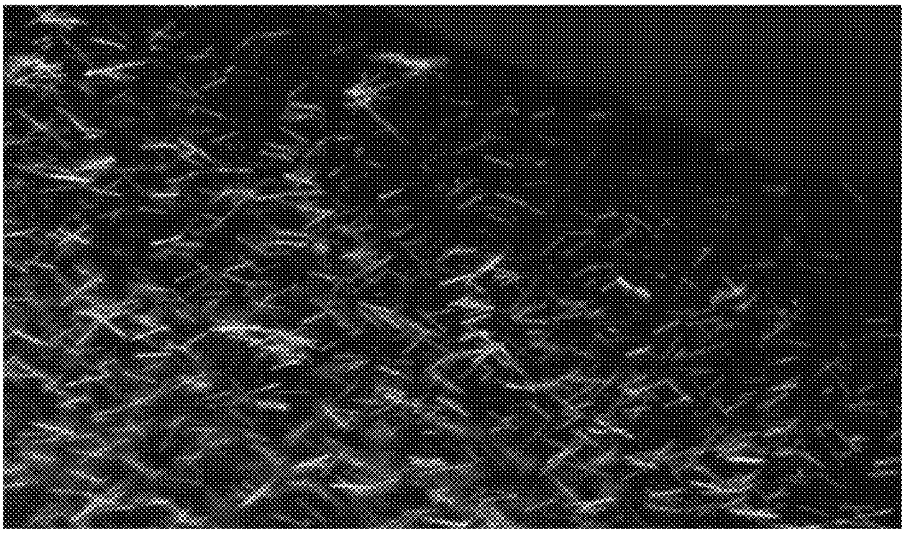
FIG. 8 is a 60× magnification of a solution of nS-nPG-OTC after 48 hours at 75° F.
Figure 9:
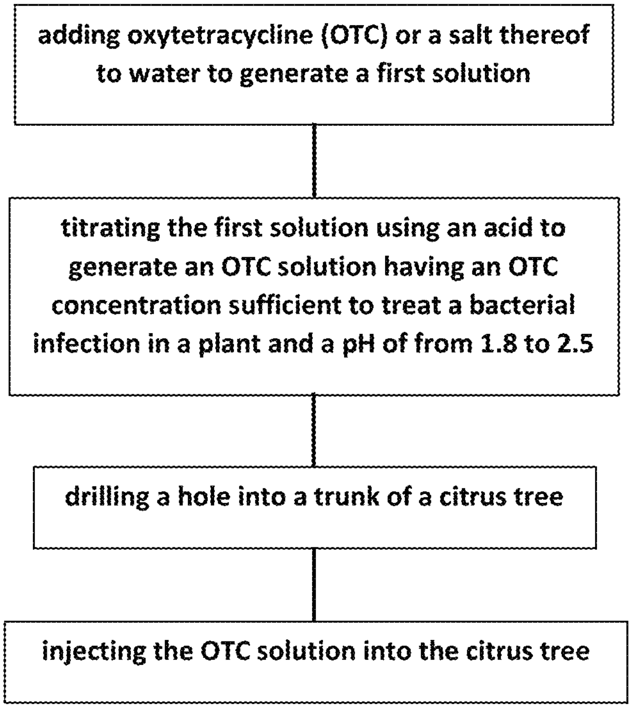
FIG. 9 is a flow diagram for a method of generating an acidified oxytetracycline solution and its use in treating a bacterial infection in a plant according to an embodiment of the disclosure.

Next, OTC solutions were prepared by first reducing the pH of water to pH 2 using hydrochloric acid. 11.0 g of PG-OTC (>95%) and non-sterile, nS-nPG-OTC (putatively 95%) each were dissolved into 1.0 L of the pH 2 water to generate 11,000 ppm test solutions, which then were monitored visually at 10× magnification. Immediately upon preparation at 75° F., the PG-OTC solution was essentially homogeneous and the nS-nPG-OTC solution was moderately nonhomogeneous, as is shown in FIG. 4. As is shown in FIGS. 5-7, there was a marked difference in homogeneity of the PG-OTC and nS-nPG-OTC solutions after 24 hours at 75° F., 48 hours at 75° F., and two hours at 100° F., respectively, with the nS-nPG-OTC solutions being substantially nonhomogeneous. To elucidate the nonhomogeneous nature of the nS-nPG-OTC solutions, visualization was performed at 60× magnification, as is shown in FIG. 8 and wherein an abundance of actively growing needle-like crystals having lengths of approximately 10-250 μm are visible. These needle-like crystals likely comprise OTC and/or OTC and one or more impurities.

III. Functional Testing of OTC Solutions Prepared Using OTC of Different Qualities The test article solutions (11,000 ppm) were prepared as above and were fluidly pressurized into latex injection devices (FLexInect™, TJ Biotech LLC, Buffalo, SD) and then were injected into rootstock of uniform, commercially grown, Valencia citrus trees. The injection devices were monitored to measure uptake rates of the solutions.

Trial 1—50 mL OTC Solution Uptake—Warm Temperatures

Table 2 presents the results of Trial 1, which used trees (n=10) having trunk diameters between 2.125" and 3.00". 50 mL of the test solutions were injected with the ambient temperature between 80° F. and 90° F., in which temperature range transpiration in the vascular system of the trees is most active.

Trial 1 conclusions: The PG-OTC solution had an injection time 6.9 minutes (55.1%) lower than nS-nPG-OTC solution. Uptake rates were statistically significant at LSD P=0.05.

TABLE 2

| Treatment # | Treatment | Time (Minutes) |
|---|---|---|
| 1 | 50 mL PG-OTC | 8.4 b |
| 2 | 50 mL nS-nPG-OTC | 15.3 a |
| LSD P = 0.05 | | 5.13 |
| Standard Deviation | | 5.07 |
| CV | | 42.79 |

Trial 2—100 mL OTC Solution Uptake—Warm Temperatures

Table 3 presents the results of Trial 2, which used trees (n=10) having trunk diameters between 3.00" and 4.25". 100 mL of the test solutions were injected with the ambient temperature between 80° F. and 90° F.

Trial 2 conclusions: The PG-OTC solution had an injection time 116.5 minutes (86.5%) lower than the nS-nPG-OTC solution. Uptake rates were statistically significant at LSD P=0.01.

TABLE 3

| Treatment # | Treatment | Time (Minutes) |
|---|---|---|
| 1 | 100 mL PG-OTC | 18.2 b |
| 2 | 100 mL nS-nPG-OTC | 134.7 a |
| LSD P = 0.01 | | 44.05 |
| Standard Deviation | | 30.31 |
| CV | | 39.64 |

Trial 3—100 mL OTC Solution Uptake—Cold Temperatures

Table 4 presents the results of Trial 3, which used trees (n=30) having trunk diameters between 3.00" and 4.25". Up to 100 mL of the test solutions were injected with the ambient temperature <70° F., at which temperatures transpiration in the vascular system is reduced. In this trial, the injections were stopped at 120 minutes regardless of if injections were complete.

Trial 3 conclusions: The PG-OTC solution had an injection time 36.2 minutes (30.9%) lower than the nS-nPG-OTC solution. Uptake rates were statistically significant at LSD P=0.01.

TABLE 4

| Treatment # | Treatment | Time (Minutes) |
|---|---|---|
| 1 | 100 mL PG-OTC | 81.1 b |
| 2 | 100 mL nS-nPG-OTC | 117.33 a |
| LSD P = 0.01 | | 23.06 |
| Standard Deviation | | 32.40 |
| CV | | 32.65 |

Overall Conclusions from Functional Testing

Our studies clearly demonstrate that PG-OTC solutions were readily absorbed by trees, whereas, after the first 50 mL of nS-nPG-OTC solution goes into a tree, there is a marked decrease in absorption rate. The decreased absorption rates could be due multiple factors including the tree's response to impurities or the interaction of crystals in the nS-nPG-OTC solution with the tree's Xylem. While residues are within tolerance (10 PPB) in the fruit when using PG-OTC solutions, the decreased absorption rates using nS-nPG-OTC solutions may lead to residue issues, which may potentially be harmful to consumers and/or to the trees. The decreased absorption rates also likely will induce bacterial resistance.

Research by others (Archer, L., & Albrecht, U. (2023). Evaluation of Trunk Injection Techniques for Systemic Delivery of Huanglongbing Therapies in Citrus. *HortScience,* 58(7), 768-778. Retrieved Dec. 2, 2023, from https://doi.org/10.21273/HORTSCI17172-23 has shown that sustained pressure and elevated chemical exposure time during treatment of trees by injection can cause an increase in tree wounding, irrespective of environmental conditions, such as temperature, water availability, or the like. Quicker injection processes would provide significant economic improvements by reducing labor costs, tree damage that results from wounding and chemical exposure, increasing injector reusability, and improving OTC distribution throughout the tree. The impact of tree injury can lead to an increased incidence of physical damage caused by factors such as wind, unwanted plant exposure to herbicides, and incidences of infections by other plant pathogen, all of which can reduce the short-term and long-term productivity of perennial crops.

IV. Efficacy Testing of PG-OTC Solutions in Valencia Orange Tree Trials

Study 1—Comparison of Injection and Spray Applications

Table 5 below provides the results of this study. For Treatment 1, a 5,500 ppm solution of PG-OTC was prepared using distilled water. This solution then was acidified to pH 2 using hydrochloric acid. Each tree (n=9) was injected with 50 mL of the OTC solution, delivering 0.275 grams of OTC·HCl. For Treatment 2, 2.5 g of PG-OTC was dissolved in 2 gallons of water. The resultant solution was sprayed onto the foliage of the trees at a rate of 1 quart (0.3125 g OTC·HCl) per tree (n=9). Vigor ratings were performed 60 days after application of treatments.

Trial conclusions: Trunk injection of PG-OTC solutions was more effective than application of unacidified PG-OTC solutions to foliage by spraying.

TABLE 5

| Trt # | Treatment | Vigor Rating (1-5) |
|---|---|---|
| 1 | PG-OTC solution, pH 2, injected | 3.39 a |
| 2 | PG-OTC-aqueous solution, sprayed | 2.67 b |
| LSD P = .05 | | 0.477 |

Study 2—Comparison of PG-OTC Solutions at pH 2 and pH 7

Table 6 below provides the results of this study. For Treatment 1, a 5,500 ppm solution of PG-OTC was prepared using distilled water. This solution was first acidified to pH 2 using hydrochloric acid. Each tree (n=9) was injected with 50 mL of the OTC solution, delivering 0.275 grams of OTC-HCl. For treatment 2, a 5,500 ppm solution of PG-OTC was prepared using distilled water and buffered to pH 7 using NaOH. Each tree (n=9) was injected with 50 mL of the OTC solution, delivering 0.275 grams of the OTC solution per tree. Treatment 3 was an untreated control. After injection, fruit counts were observed.

Trial conclusions: In this trial, injections of OTC at pH 2 using hydrochloric/muriatic acid reduced fruit drop by an average of 15 pieces of fruit (60% reduction) relative to the Untreated Control and 9 pieces of fruit (48.4% reduction) relative to the OTC pH 7 injection. This was statistically significant at LSD p=0.05.

TABLE 6

| Treatment Number | Treatment | Fruit Drop Count |
|---|---|---|
| 1 | OTC pH 2 Injection | 10 c |
| 2 | OTC pH 7 Injection | 19 b |
| 3 | Untreated Control | 25 a |
| LSD p = 0.05 | | 5.4 |
| Standard Deviation | | 5.4 |
| CV | | 30.24 |

Table 7 represents a working example on dosing a desired amount of OTC into a tree or vine. Factors that could alter the dosage include overall plant health, i.e., a decline in vascular biomass caused by the pathogen, hedging and pruning, and environmental factors, such as temperature, moisture, and stress.

TABLE 7

| Trunk Diameter (inches) | PG-OTC (PPM) | Volume Injected (mL) | PG-OTC (g per Tree/Vine) |
|---|---|---|---|
| 1.25-1.75 | 550-1,100 | 25 | 0.014-0.028 |
| 1.75-2.12 | 550-2,200 | 50 | 0.027-0.11 |
| 2.12-3.00 | 5,500-11,000 | 25 | 0.14-0.28 |
| 3.00-4.25 | 5,500-11,000 | 50 | 0.28-0.55 |
| 4.25-6.00 | 5,500-11,000 | 100 | 0.55-1.10 |
| >6.00 | 5,500-11,000 | 150-200 | 0.825-2.20 |

Generally, the volume of treatment injected would be proportional to a diameter of a trunk of a tree. Trees having vascular networks damaged by disease would be treated at lower concentrations to prevent phytotoxicity. As the trees recover, the concentration of PG-OTC can be increased to mitigate risk of reinfection.

Although the foregoing invention has been described in some detail by way of illustration and example for purposes of clarity and understanding, it will be readily apparent, in light of the teachings of this invention, that certain changes and modifications may be made thereto without departing from the spirit or scope of the following claims.

Therefore, the foregoing is considered as illustrative only of the principles of the disclosure. Further, since numerous modifications and changes will readily occur to those skilled in the art, it is not desired to limit the disclosure to the exact compositions and methods of use, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A method of generating an acidified oxytetracycline solution and for its use in treating a bacterial infection in a plant, the method comprising the steps of:

adding oxytetracycline (OTC) or a salt thereof to water to generate a first solution;

titrating the first solution using an acid to generate the acidified OTC solution having an OTC concentration sufficient to treat the bacterial infection in the plant and a pH in the range of 1.8 to 2.5, the acidified OTC or the salt thereof having a purity sufficient to generate the acidified OTC solution that is substantially stable for a time period required for its delivery to the plant, the OTC or the salt thereof has a purity greater than or equal to 92%; and delivering the acidified OTC solution systemically to the plant.

2. The method of claim 1, wherein the acid comprises one or both of an inorganic acid and an organic acid.

3. The method of claim 2, wherein the inorganic acid comprises hydrochloric acid.

4. The method of claim 1, wherein the OTC solution has an OTC concentration of 500 to 25,000 parts per million.

5. The method of claim 1, wherein the OTC solution has an OTC concentration of 5000-12,000 parts per million.

6. The method of claim 1, wherein the systemic delivery of the acidified OTC solution to the plant entails the steps of:

drilling a hole into the rootstock or trunk of a tree or vine; and injecting the acidified OTC solution into a vascular network of the tree or vine.

7. A citrus tree treated according to the method recited in claim 6.

8. The method of claim 5, wherein the systemic delivery of the acidified OTC solution to the plant entails the steps of:

drilling a hole into the rootstock or trunk of a tree or vine; and injecting the acidified OTC solution into a vascular network of the tree or vine.

9. A citrus tree treated according to the method recited in claim 8.

* * * * *